United States Patent [19]
Iida et al.

[11] Patent Number: 5,882,822
[45] Date of Patent: Mar. 16, 1999

[54] BATTERY ELECTRODE AND METHOD FOR THE PREPARATION THEREOF

[75] Inventors: Tamaki Iida, Ibaraki-ken; Masaki Kasashima, Fukui-ken, both of Japan

[73] Assignee: Shin-Etsu Chemical Co., Ltd., Tokyo, Japan

[21] Appl. No.: 703,980

[22] Filed: Aug. 28, 1996

[30]  Foreign Application Priority Data

Sep. 28, 1995 [JP] Japan .................................. 7-250266

[51] Int. Cl.$^6$ ............................ H01M 4/70; H01M 4/80
[52] U.S. Cl. ...................... 429/235; 429/233; 429/234; 205/208; 205/205; 205/210; 205/158; 205/161
[58] Field of Search .................................. 429/233, 234, 429/235, 223; 205/208, 205, 75, 158, 161, 210

[56] References Cited

U.S. PATENT DOCUMENTS

| | | |
|---|---|---|
| 3,694,325 | 9/1972 | Katz et al. . |
| 4,251,603 | 2/1981 | Matsumoto et al. ...................... 429/94 |
| 4,957,543 | 9/1990 | Babjak et al. ............................. 429/233 |
| 5,431,856 | 7/1995 | Okoniewski et al. ................... 252/500 |
| 5,434,024 | 7/1995 | Ikeda et al. ............................... 429/234 |

FOREIGN PATENT DOCUMENTS

| | | |
|---|---|---|
| 0151064 | 8/1985 | European Pat. Off. . |
| 0609180 | 8/1994 | European Pat. Off. . |

OTHER PUBLICATIONS

Patent Abstracts of Japan, vol. 008, No. 272 & JP–A–59 143275 Aug. 16, 1984.
Patent Abstracts of Japan, vol. 008, No. 277 & JP–A–59 146160 Aug. 21, 1984.
Patent Abstracts of Japan, vol. 008, No. 213 & JP–A–59 099676 Jun. 8, 1984.

*Primary Examiner*—Maria Nuzzolillo
*Assistant Examiner*—Carol Chaney
*Attorney, Agent, or Firm*—McAulay Nissen Goldberg Kiel & Hand, LLP

[57] ABSTRACT

Proposed is an improvement in the method for the preparation of a battery electrode consisting of a spongy metal sheet to serve as a substrate having a three-dimensional skeletal structure with intercommunicating open pores and an active material filling the open pores of the skeletal structure of the substrate. While the conventional process comprises the steps of imparting electroconductivity to the surface of the skeleton of a foamed resin sheet, forming a plating layer of a metal on the surface of the foamed resin imparted with conductivity and removing the resin by thermal decomposition to leave the metallic plating layer alone followed by impregnation of the open pores with a pasty active material, the improvement of the invention comprises subjecting the foamed resin sheet, prior to the step of imparting the resin surface with electroconductivity, to a low temperature plasma treatment so as to remove the spiky fragments or dendritic protrusions of the resin on the surface of the skeleton so that the impregnating work of the skeletal space of the spongy metal sheet with a pasty active material is greatly facilitated and the durability of the battery prepared by using the battery electrode is remarkably increased. Further, an additional improvement can be obtained by forming the metallic plating layer on the foamed resin skeleton having a larger thickness in the marginal areas of the foamed resin sheet than in the center area surrounded by the marginal areas.

4 Claims, 2 Drawing Sheets

BATTERY ELECTRODE AND METHOD FOR THE PREPARATION THEREOF

BACKGROUND OF THE INVENTION

The present invention relates to an electrode of secondary batteries and a method for the preparation thereof. More particularly, the invention relates to a high-performance electrode of alkali storage batteries such as nickel metal hydride batteries as well as to a method for the preparation thereof.

It is a remarkable trend of electronic technologies in recent years that various kinds of very compact and portable electronic instruments, such as portable telephones and the like, are acquiring wide prevalence. Since these instruments are operated with batteries as the power source, the utilizability thereof largely depends on the performance of the batteries, in most cases, in the form of a cylindrical sealed secondary battery which is desired to have a high energy capacity and is of low costs. Alkali storage batteries are used, as the major current, as the secondary battery in the portable instruments. As the material of the electrodes in these secondary batteries, spongy or porous metal sheets are high-lighted in recent years as the substrate to be impregnated with an active material of the electrode as is disclosed in Japanese Patent Kokai 57-52479, 61-42377, 62-54235 and 63-81767.

The above mentioned spongy metal sheet is prepared from a base body of a foamed resin sheet having a three-dimensional network structure which is first subjected to a plating treatment of a metal such as nickel followed by direct impregnation of the skeletal structure with an active material of the electrode and shaping the body into the form of a battery electrode.

The above described prior art method for the preparation of a battery electrode has a problem as mentioned below. As is schematically illustrated in FIG. 1 of the accompanying drawing, namely, it is sometimes the case that the skeleton 1 of the base body of a foamed resin forming open pores 2 has spiky fragments 3A or dendritic protrusions 3B formed on the surface of the skeleton 1 of the foamed resin and is partly covered with a thin membrane 3C bridging the skeleton to cause sealing of the pores so that the spongy metal sheet may suffer from a decrease in the smoothness of impregnating work of the open pores in the skeleton with a pasty active material and/or catalyst of the battery electrode. Accordingly, the amount of impregnation of the skeletal structure with an active material or catalyst is necessarily decreased. When the electrode sheet after impregnation with the active material and catalyst is overlaid with an electrode separator sheet and wound together into the form of a cylindrical roll, in addition, the needlelike or spiky fragments 3A and/or dendritic protrusions 3B in the electrode sheet sometimes pierce the separator sheet to cause short-circuiting between the positive and negative electrodes of the battery so that the life of the battery is greatly decreased.

SUMMARY OF THE INVENTION

The present invention accordingly has an object to provide a novel and improved battery electrode of alkali storage batteries free from the above described problems and disadvantages in the battery electrodes of the prior art as well as a method for the preparation of such an improved battery electrode.

Thus, the battery electrode provided by the present invention is an electrode consisting of a sheet of a spongy metal as the substrate having a three-dimensionally developed continuous skeletal structure impregnated with an active material of electrode, the skeleton of the spongy metal sheet as the substrate having an intercommunicating structure and having a smooth surface.

The present invention further provides an improvement, in the method for the preparation of the above defined battery electrode comprising the steps of: imparting electroconductivity to the surface of a skeleton of a foamed resin sheet having a three-dimensional network structure; forming a plating layer of a metal on the surface of the foamed resin thus imparted with electroconductivity; removing the resin by sintering and thermal decomposition from the composite of the foamed resin and the metal plating layer thereon to leave the skeleton of the metallic plating layer alone in the form of a spongy metal sheet; and impregnating the open pores of the metallic skeletal structure with an active electrode material, which improvement comprises removing the spiky fragments 3A and dendritic protrusions 3B of the resin on the surface of the skeleton 1 of the foamed resin sheet as well as the membranes 3C bridging the skeleton to seal the open pores prior to the step of imparting electroconductivity to the surface of the foamed resin skeleton by decomposition with a low-temperature plasma treatment.

In particular, the above described inventive method is practiced according to the procedure comprising the steps of: subjecting a sheet of a foamed plastic resin having a three-dimensional network structure to a low-temperature plasma treatment to remove the spiky fragments, dendritic protrusions and membranes bridging the skeletal structure; imparting the skeletal surface of the foamed plastic resin sheet with electroconductivity by a coating treatment with a carbon colloid; bringing a feed electrode into direct contact with the surface of the foamed resin sheet in an electrolytic plating bath; moving the feed electrode relative to the surface of the foamed resin sheet while a counterelectrode is held in direct contact with the surface of the foamed resin sheet so as to form an electroconductive metal-plating layer on the surface of the foamed resin skeleton; and removing the foamed resin in the metal-plated foamed resin sheet by incineration leaving the metal plating layer alone in the form of a spongy metal sheet followed by the impregnation of the open pores of the metallic skeletal structure with an active material of the electrode.

In another aspect of the invention, a further improvement is provided, in the method for the preparation of the battery electrode comprising the steps of: imparting electroconductivity to the surface of a skeleton of a foamed resin sheet having a three-dimensional network structure; forming a plating layer of a metal on the surface of the foamed resin of the sheet thus imparted with electroconductivity; removing the resin by incineration from the composite of the foamed resin and the metal plating layer thereon to leave the skeleton of the metallic plating layer alone; and impregnating the open pores of the metallic skeletal structure with an active electrode material, which improvement comprises: forming a metal plating layer on the skeletal surface of the foamed resin sheet in a 1 to 5 mm wide marginal areas of the sheet having a thickness by 40 to 60% larger than in the areas surrounded by the marginal areas by the use of a feed electrode oversized relative to the dimension of the foamed resin sheet.

DETAILED DESCRIPTION OF THE PREFERRED EMBODIMENTS

The plastic resin forming the foamed resin sheet having a three-dimensional network structure to serve as the starting material of the inventive electrode is selected from the group consisting of polyurethane resins, polyester resins, polyvinyl chloride resins, polystyrene resins, polypropylene resins and the like, of which polyurethane resins and polypropylene resins are preferred.

The foamed resin sheet having a three-dimensional network structure should have a porous structure mostly consisting of open pores with a porosity in the range from 85% to 99% or, preferably, from 90% to 98%. When the porosity of the foamed resin sheet is too low, the spongy metal sheet prepared therefrom can be impregnated with a pasty active material undesirably leaving a substantial portion of unfilled spaces while, when the porosity of the foamed resin is too high, the spongy metal sheet prepared therefrom would have an insufficient mechanical strength due to the slenderness of the foamed resin skeleton.

Figure 1:
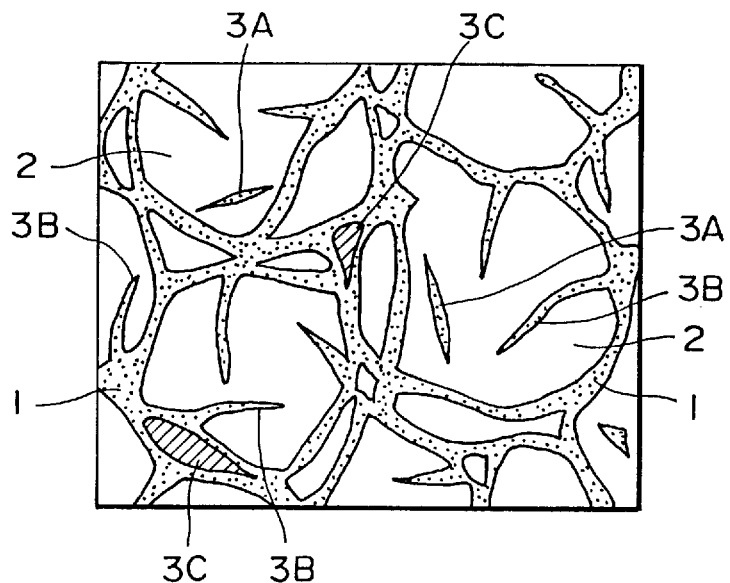
FIG. 1 is a schematic cross sectional view of the skeletal structure of a foamed resin sheet in the prior art having spiky fragments and dendritic protrusions as well as membranes bridging the skeleton.

The skeleton of the above mentioned foamed resin sheet has spiky fragments 3A and dendritic protrusions 3B on the surface of the skeleton 1 forming open spaces 2 as well as membranes 3C bridging the skeleton 1 as is schematically illustrated in FIG. 1 by an enlarged schematic cross sectional view. In the inventive method, these disordered portions of the foamed resin structure are removed, prior to the step to impart electroconductivity to the surface of the skeleton 1, by a low-temperature plasma treatment.

The low temperature plasma treatment is conducted by generating electric discharge between electrodes of a plasma chamber with application of a high-frequency electric power at a frequency of 100 kHz to 100 MHz in a low-pressure atmosphere of a plasma gas which can be selected from oxygen, air, chlorine, ammonia and the like. Air and oxygen are preferred when it is desired to impart hydrophilicity to the surface of the foamed resin. The pressure of the plasma atmosphere is in the range from 0.05 Torr to 0.4 Torr or, preferably, from 0.1 Torr to 0.2 Torr. The power supply to the electrodes is in the range from 10 watts to 200 watts or, preferably, from 50 watts to 150 watts though, needless to say, dependent on the size of the foamed resin sheet and other factors. When the electric power is too small, removal of the disordered portions of the skeleton in the foamed resin sheet is incomplete unless the treatment time is unduly extended while, when the power is too large, an overly effect of plasma decomposition is caused also on the skeleton 1 of the foamed resin sheet.

The foamed resin sheet under the low-temperature plasma treatment is kept at a temperature in the range from 10° C. to 50° C. or, preferably, from 20° C. to 30° C. Though dependent on the types of the resin and other factors, the low temperature plasma treatment of the foamed resin sheet is complete by continuing the treatment for a length of time usually in the range from 0.5 minute to 5 minutes or, in most cases, from 0.5 minute to 2 minutes so that the spiky fragments 3A and dendritic protrusions 3B on the skeleton of the foamed resin sheet as well as the membranes bridging the skeleton are decomposed and completely removed to give a foamed resin sheet free from such disordered portions and suitable as a starting material of the inventive electrodes with smooth surfaces.

Figure 2:
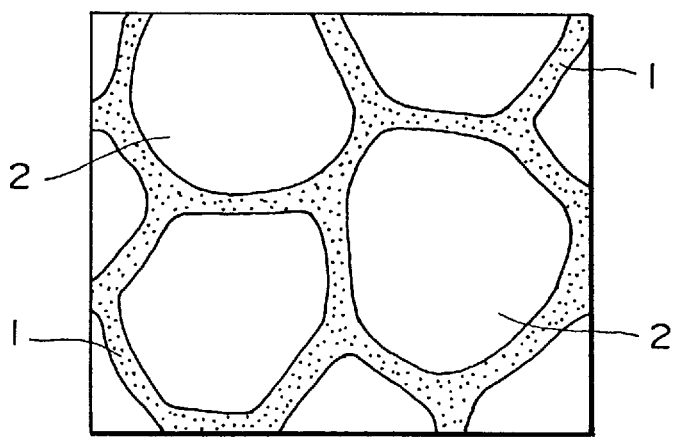
FIG. 2 is a schematic cross sectional view of the skeletal structure of a foamed resin sheet after the low-temperature plasma treatment according to the invention having a smooth surface without spiky fragments, dendritic protrusions and membranes.

FIG. 2 of the accompanying drawing is an enlarged schematic cross sectional view of the resinous skeleton 1 of the thus obtained foamed resin sheet as examined with an electron microscope. As is clear from this figure, the surface of the resinous skeleton facing the open spaces 2 is smooth without spiky fragments, dendritic protrusions and membranes bridging the skeleton.

In the next step to follow the above described low-temperature plasma treatment of the foamed resin sheet, the foamed resin sheet is subjected to a treatment to impart electroconductivity to the surface of the resinous skeleton by using an electroconductive material such as a carbon colloid and an emulsion of an acrylic resin containing fine particles of carbon or nickel uniformly dispersed therein or by conducting an electroless plating treatment or, preferably, by using a dispersion of a carbon colloid or an emulsion of an acrylic resin containing carbon particles. The electroconductive material is dispersed in water or an alcohol, e.g., methyl and ethyl alcohols, in a concentration of 0.5% to 70% by weight calculated as solid and the foamed resin sheet as the base body after the low temperature plasma treatment is dipped in the dispersion for 0.5 to 5 minutes or, preferably, for 1 to 2 minutes followed by drying so as to form an electroconductive layer on the surface of the foamed resin skeleton. In this way, the surface of the foamed resin sheet as a bulk is imparted with a sheet resistance in the range from $10^2$ ohm to $10^4$ ohm.

In the next step, the foamed resin sheet imparted with electroconductivity on the surface of the resinous skeleton is subjected to an electrolytic plating treatment to form a plating layer of a metal or, preferably, nickel on the surface of the resinous skeleton. The plating treatment can be performed by the method of sulfamic acid plating, Watt's bath plating, emulsion plating and the like, of which sulfamic acid plating and Watt's bath plating are preferred.

In conducting the electrolytic plating treatment of the foamed resin sheet, a feed electrode is brought into direct contact with the surface of the foamed resin sheet held in an electrolytic plating bath and the feed electrode is moved on the surface while a counter-feed electrode is held in direct contact with the surface of the foamed resin sheet so that metallic plating can be conducted on the surfaces of the foamed resin skeleton. Though dependent on the composition of the electrolytic plating bath, the moving velocity of the feed electrode is in the range from 0.01 to 1.5 meters/minute. The thickness of the metallic plating layer on the surface of the skeleton of the foamed resin sheet is, though dependent on the types of the battery with the inventive electrode, preferably in the range from 10 to 25 $\mu$m as an electroconductive material. A problem encountered when the thickness is too small is that the electric current flows through the surface layer of the battery electrode if not to mention the unduly low mechanical strength of the electrode while, when the thickness of the metallic plating layer is too large, a decrease is caused in the current-collecting efficiency. It is advantageous in this regard to have a larger thickness of the metallic plating layer by 40 to 60% on the surface of the resinous skeleton in the marginal areas of the foamed resin sheet having a width of 1 to 5 mm than in the center areas of the foamed resin sheet surrounded by the marginal areas, preferably, in the form of a frame so as to impart a mechanical reinforcing effect to the foamed resin sheet. Such an increased thickness of the metallic plating layer in the marginal areas of the foamed resin sheet can be obtained by the use of a feed electrode having a larger size than the foamed resin sheet per se protruding from the peripheries by a few millimeters so that the electric current density in the electrolytic plating treatment is larger in the marginal areas than in the center area surrounded by the marginal areas. When the thickness increase of the plating layer in the marginal areas is smaller than 40% over the thickness in the center areas, the desired mechanical reinforcing effect cannot be fully obtained while, when the thickness increase is too large, the foamed resin sheet after the plating treatment has disadvantageously decreased flexibility.

In the next step, the foamed resin sheet provided with the metallic plating layers on the surface of the resinous skeleton is subjected to a heat treatment in air in an electric furnace at a temperature in the range from 600° to 800° C. for 5 to 20 minutes in an atmosphere of air so as to thermally decompose and remove the resin forming the skeleton leaving a spongy metal sheet. When the temperature is too low, thermal decomposition of the foamed resin is incomplete while, when the temperature is too high, an increase is caused in the electric resistance along with a decrease in the ultimate elongation of the spongy metallic sheet due to undue oxidation of the plating layer of, e.g., nickel.

Thereafter, the spongy metal sheet after the above mentioned thermal decomposition or incineration of the resinous skeleton is subjected to a further heat treatment at a temperature in the range from 800° to 1200° C., preferably, in an atmosphere of hydrogen for 10 to 30 minutes so that any remaining residue of the resinous material is completely decomposed and removed and the metallic plating layer alone is freed from carbonaceous materials and left alone in the form of a spongy metal sheet along with reduction of the oxidized metal surface. When the temperature in this second heat treatment is too low, removal of the carbonaceous materials by thermal decomposition is incomplete and reduction of the oxidized metal surface is also incomplete while, when the temperature is too high, the spongy structure of the metal per se is sintered. It is important that the heat treatment of the foamed resin sheet provided with the metallic plating layer is performed in two steps as is described above. If the heat treatment is undertaken in one step at a high temperature, a carbide of the metal, e.g., nickel carbide, is formed to cause an increase in the electric resistance along with a great decrease in the elongation of the electrode sheet.

The battery electrode of the present invention to serve as a negative or positive electrode is obtained by impregnating the open pores of the spongy metal sheet with an active electrode material in the form of a paste followed by shaping in a method of compression molding and the like. The active material for filling the open pores of the skeleton in the spongy metal sheet is a paste of an alloy powder consisting of a first metallic constituent which is selected from rare earth metals including lanthanum, cerium, praseodymium and neodymium and a second metallic constituent selected from the group consisting of nickel as the principal constituent, optionally, in combination with manganese, cobalt, aluminum, iron and/or copper. In particular, the active material is a hydrogen-absorbing alloy consisting of the above mentioned first and second metallic constituents in a molar ratio of 1:5, 1:2 and so on or, preferably, 1:5 with which the open pores of the skeleton of the spongy metal sheet is filled. It is preferable in order to improve the initial characteristics and electroconductivity of the battery that the active material is admixed with a catalyst which is nickel, cobalt or manganese or, preferably, nickel. The above described active material is used for impregnation preferably in the form of a paste as compounded with an aqueous solution of methyl cellulose, gelatin, starch and the like.

The amount of the active material impregnating the open pores of the skeleton in the spongy metal sheet is in the range from 60% to 80% by volume or, preferably, from 65% to 78% by volume based on the volume of the open pores. When the amount of impregnation is too large, the battery electrode may be subject to the troubles of crack formation while, when the amount of the active material is too small, an increase is caused in the sheet resistance of the electrode due to incomplete impregnation of the open pores.

It is the advantage of the present invention that the open pores of the skeleton in the spongy metal sheet can be more easily impregnated with the pasty active material and the % impregnation can be higher than in the prior art because the skeleton is free from spiky fragments or dendritic protrusions on the surface and membranes bridging the skeleton as a result of the low temperature plasma treatment to accomplish smoothness on the surface of the resinous skeleton and an intercommunicating structure of the open pores so that not only the workability in the impregnation of the spongy metal sheet with a pasty active material can be greatly facilitated but also the durability of the batteries prepared by using the inventive electrodes can be remarkably increased.

In the following, embodiments of the present invention are described in more detail by way of Examples and a Comparative Example, which, however, never limit the scope of the invention in any way.

EXAMPLE 1

A foamed polyurethane resin sheet of 100 mm width, 300 mm length and 1.5 mm thickness having a three-dimensional network structure with a porosity of 98% by volume (HR-50, a product by Bridgestone Chemical Co.) was set in a chamber for low temperature plasma treatment and the space inside the chamber was evacuated to have a pressure of 0.02 Torr. Thereafter, oxygen gas was introduced into the chamber to increase the pressure inside of the chamber up to 0.20 Torr. A high frequency electric power of 130 watts at a frequency of 13.56 MHz was applied to the electrodes of the plasma chamber to generate plasma in the chamber by which the foamed resin sheet was subjected to a low temperature plasma treatment for 2 minutes.

The foamed resin sheet taken out of the plasma chamber was immersed in a 50% aqueous dispersion of carbon colloid for 1 minute followed by drying so as to impart the surface of the skeleton of the foamed resin sheet with electroconductivity. The sheet resistance of the thus treated foamed resin sheet was $6 \times 10^2$ ohm.

Figure 3A:
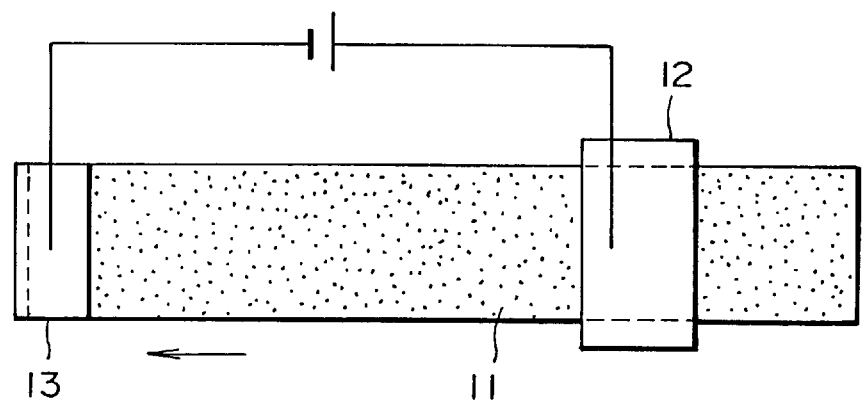
FIGS. 3A and 3B are illustration of the plating procedure by the use of an oversized feed anode moved relative to the surface of the foamed resin sheet by a plan view and by a side view, respectively.
Figure 3B:
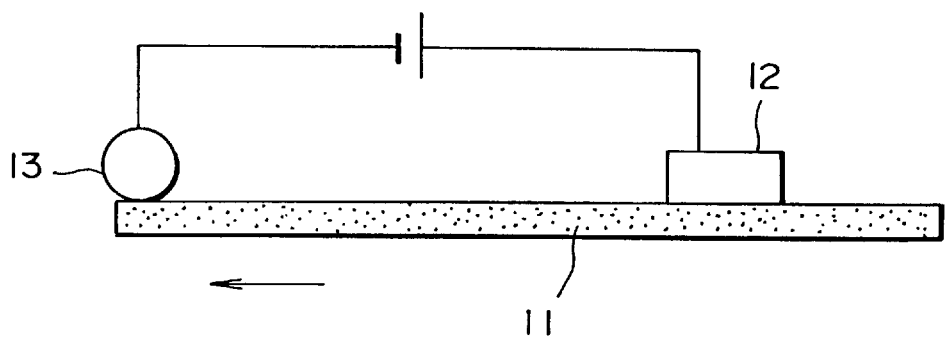

As is illustrated in FIGS. 3A and 3B, the foamed resin sheet 11 held horizontally in a sulfamic acid plating bath was contacted, on one surface, with an anodic feed electrode 12 in the form of a plate having a width of 110 mm and a length of 50 mm while a cylindrical cathodic feed electrode 13 having a width of 100 mm was in direct contact with the foamed resin sheet 11 at one end. The anodic feed electrode 12 was moved in the longitudinal direction of the foamed resin sheet 11 relative to the sheet from one end to the other taking 5 minutes. Then, the foamed resin sheet 11 was reversed upside-down and the same electrolytic plating treatment as above was conducted also taking 5 minutes. The thus obtained plating layer of nickel had a thickness of about 15 $\mu$m in most parts excepting the marginal areas of about 3 mm width where the thickness was about 23 $\mu$m as a consequence of protrusion of the anodic feed electrode 12 by 5 mm out of the respective peripheries in the above described electrolytic plating treatment.

The electrolytic plating conditions were as follows:

| | |
|---|---|
| nickel sulfamate | 300 g/liter; |
| nickel chloride | 30 g/liter; |
| boric acid | 30 g/liter; |
| pH | 3.5 to 4.0; |
| temperature | 50° C.; and |
| current density | 2 to 100 A/dm$^2$. |

The thus obtained foamed resin sheet having a plating layer of nickel on the resinous skeleton was put into an electric furnace and heated at 700° C. for 10 minutes in an atmosphere of air so that the polyurethane resin was thermally decomposed and removed to leave the skeletal nickel layer in the form of a spongy sheet which was further heated in an atmosphere of hydrogen at 950° C. for 20 minutes to give a sintered spongy nickel sheet having a thickness of 0.8 mm and planar dimensions substantially identical with the starting foamed resin sheet.

The above described procedure for the preparation of a spongy nickel sheet was repeated always in success each time to obtain numbers of defect-free spongy nickel sheets.

The spongy nickel sheet having a thickness of 0.8 mm was cut into strips of 32 mm width and 220 mm length, each of which was impregnated manually with a pasty active material prepared from 3 g of a 2% aqueous solution of methyl cellulose and 15 g of flaky particles of a hydrogen-absorbing alloy passing through a screen of 200 mesh opening, which had a chemical composition of the formula $(La_{45}Ce_{10}Pr_{10}Nd_{35})(Ni_{3.3}Co_{0.8}Mn_{0.6}Al_{0.3})$, followed by compression under a pressure of 2 tons/cm$^2$ into an electrode having dimensions of 32 mm width, 220 mm length and 0.4 mm thickness. The value of % impregnation of this electrode with the active material was 74%.

One hundred cylindrical sealed batteries were prepared by using the electrodes prepared in the above described manner and subjected to the charge-and-discharge test to find that the durability of the battery was limited in none of the 100 batteries by shortcircuiting between positive and negative electrodes as a consequence of insulation break of the separator due to piercing by spiky fragments or dendritic protrusions.

EXAMPLE 2

The same experimental procedure as above was undertaken except that the anodic feed electrode in the electrolytic plating treatment had a width smaller by 20 mm than the foamed resin sheet under treatment. The plating layer of nickel thus formed had a thickness of 15 μm in all of the sheet.

The sheets after the plating treatment were subjected to the two-step heat treatment under the same conditions as in Example 1 to find mechanical damages were found in four fifths of the spongy nickel sheets more or less in the edges and corners due to mechanical shocks during processing.

Excepting the above described defects in the spongy nickel sheets, the results of the test as the electrodes of 100 alkali storage batteries were as satisfactory as in Example 1.

Comparative Example

The procedure for the preparation of the battery electrodes was substantially the same as in the Example 2 described above excepting omission of the low-temperature plasma treatment of the starting foamed polyurethane resin sheets. All of the spongy nickel sheets after the heat treatment were found to have defects such as cracks and chippings. The impregnation work of the spongy nickel sheet with the pasty active electrode material could not be performed so smoothly as in the Examples and the value of % impregnation therewith was only 62%.

The durability test of 100 cylindrical sealed batteries prepared from the thus obtained comparative electrodes was conducted by repeating charging and discharging to find that the durability of the battery was limited in four of the 100 batteries by shortcircuiting between the positive and negative electrodes as a consequence of insulation break of the separator due to piercing by spiky fragments or dendritic protrusions.

What is claimed is:

1. In a method for the preparation of a battery electrode consisting of a metal substrate having a three-dimensional skeletal structure with intercommunicating open pores and a pasty active material of electrode filling the open pores of the skeletal structure of the substrate comprising the steps of:

(a) imparting electroconductivity to the surface of the skeleton of a foamed resin sheet having a three-dimensional network structure;

(b) forming a plating layer of a metal on the surface of the foamed resin imparted with electroconductivity;

(c) removing the resin by thermal decomposition from the composite of the foamed resin and the metallic plating layer thereon to leave the metallic plating layer alone in the form of a metal sheet having a three-dimensional skeletal structure with intercommunicating open pores; and (d) impregnating the open pores of the metal sheet with a pasty active material of the electrode, the improvement which comprises, prior to step (a), subjecting the foamed resin sheet to a low temperature plasma treatment in an atmosphere of air or oxygen under a pressure in the range from 0.05 to 0.4 Torr.

2. In a method for the preparation of a battery electrode consisting of a metal substrate having a three-dimensional skeletal structure with intercommunicating open pores and a pasty active material of electrode filling the open pores of the skeletal structure of the substrate comprising the steps of:

(a) imparting electroconductivity to the surface of the skeleton of a foamed resin sheet having a three-dimensional network structure and a surface having a central area bound by marginal areas;

(b) forming a plating layer of a metal on the surface of the foamed resin imparted with electroconductivity by an electrolytic plating treatment;

(c) removing the resin by thermal decomposition from the composite of the foamed resin and the metallic plating layer thereon to leave the metallic plating layer alone in the form of a metal sheet having a three-dimensional skeletal structure with intercommunicating open pores; and (d) impregnating the open pores of the metal sheet with a pasty active material of the electrode, the improvement which comprises conducting the electrolytic plating treatment in step (b) by moving an anodic feed electrode, which is kept in direct contact with the surface of the foamed resin sheet, on the surface of the foamed resin sheet, the anodic feed electrode having a larger dimension than the foamed resin sheet so as to be protruded out of the periphery of the foamed resin sheet thereby forming a metallic plating layer in the marginal areas of the foamed resin sheet having a larger thickness than the thickness of the metallic plating layer in the central areas.

3. The improvement as claimed in claim 2 in which the width of the marginal areas is in the range from 1 to 5 mm.

4. The improvement as claimed in claim 2 in which the thickness of the metallic plating layer on the skeletal structure in the marginal areas of the foamed resin sheet is larger by 40% to 60% than the thickness in the central areas.

* * * * *